United States Patent [19]

Lapeyre

[11] 4,075,619
[45] Feb. 21, 1978

[54] REMOTE READING COMPASS DISPLAY

[75] Inventor: James M. Lapeyre, New Orleans, La.

[73] Assignee: The Laitram Corporation, New Orleans, La.

[21] Appl. No.: 556,081

[22] Filed: Mar. 6, 1975

[51] Int. Cl.² .............................................. G06F 3/14
[52] U.S. Cl. ........................... 340/324 R; 340/27 NA; 340/212; 340/321
[58] Field of Search .............. 340/324 R, 324 M, 336, 340/212, 198, 27 NA, 321

[56] References Cited
U.S. PATENT DOCUMENTS 3,720,918  3/1973  Perl ..................................... 340/321

Primary Examiner—Marshall M. Curtis
Attorney, Agent, or Firm—Weingarten, Maxham & Schurgin

[57] ABSTRACT

A digital compass display readily movable to different intended mounting positions and including a multidigit numerical indicator mechanically and electrically connected to an end of an electrical cable and of a small size and configuration approximating that of the cable itself.

3 Claims, 3 Drawing Figures

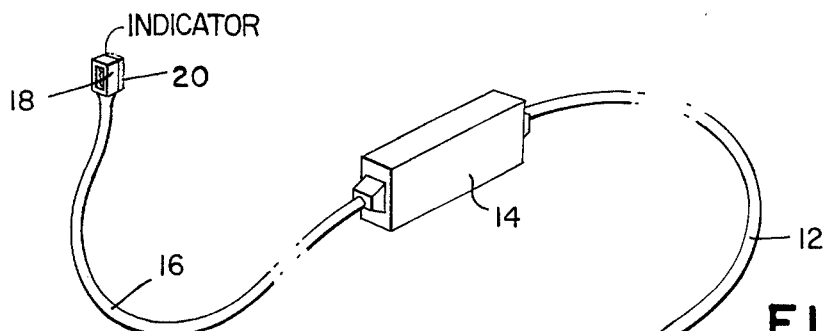
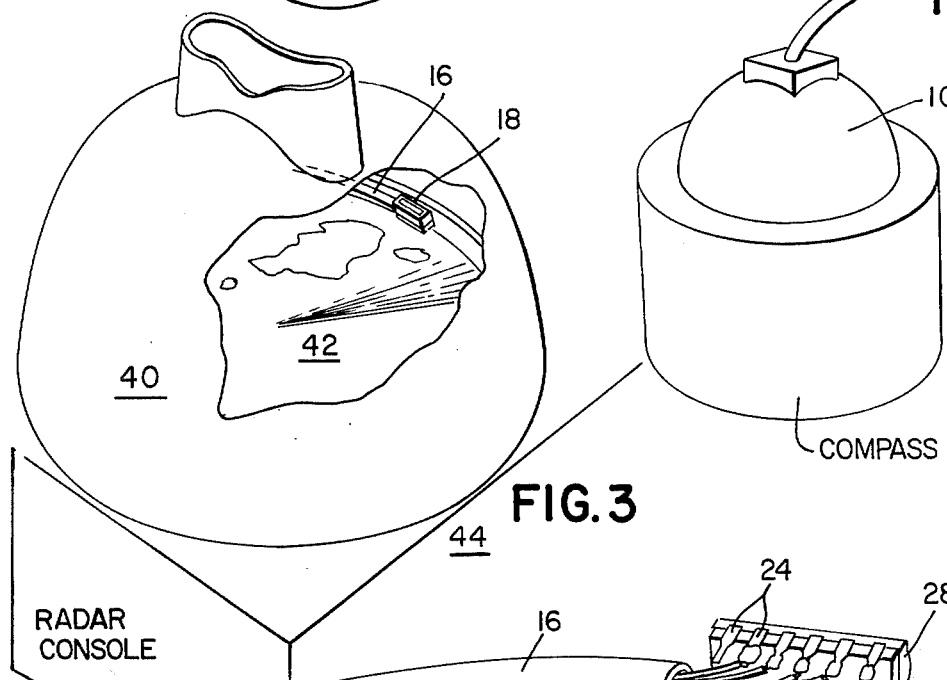
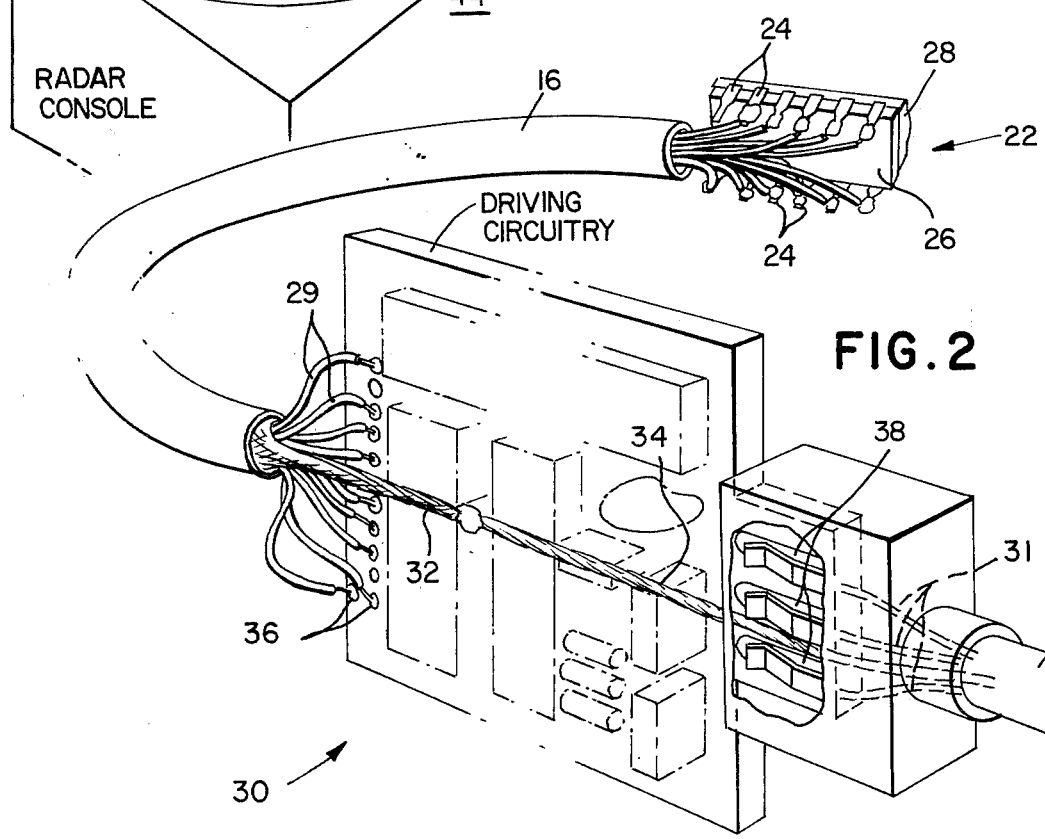

REMOTE READING COMPASS DISPLAY

FIELD OF THE INVENTION

This invention relates to magnetic compasses and more particularly to a display for remote reading magnetic compasses.

BACKGROUND OF THE INVENTION

Remote reading magnetic compasses are known for providing a signal representation of compass headings which can be conveyed to one or more remote points for display or other utilization purposes. One particularly effective remote reading compass is the subject of U.S. Pat. No. 3,833,901 entitled MAGNETIC COMPASS HAVING REMOTE DIGITAL READOUT, assigned to the assignee of this invention, wherein a serial pulse train is provided of a number of pulses representative of compass heading. Display of compass heading is usually provided by a multidigit display contained within a suitable housing located in a fixed position in the wheelhouse and other intended location aboard a vessel. It would be useful, however, to provide a digital compass display which is extremely small and adapted for removable attachment to different mounting surfaces.

SUMMARY OF THE INVENTION

Briefly, the invention provides a digital compass display which is especially adapted to semipermanent attachment during use and which is readily movable to different intended mounting positions. The novel display includes a multidigit numerical indicator mechanically and electrically connected to an end of an electrical cable and of a small size and configuration approximating that of the cable itself. A readily disconnectable fastener is affixed to the indicator for attachment to a mating fastener on a mounting surface. A circuit board is housed intermediate the length of the interconnecting cable and contains circuitry for appropriately driving the display indicators. The other end of the cable is connected to a remote reading compass transmitter which provides a digital pulse train for display energization.

The novel display finds especial use in association with a radar screen and for this purpose is typically mounted inside or within the hood of the screen in position to be visually read while viewing the radar presentation. A compass heading can be easily noted substantially simultaneously with notation of a radar fix without need for looking away from the radar screen at a separate compass display and without requiring a second person to be present to note compass heading while taking a radar fix.

DESCRIPTION OF THE DRAWINGS

The invention will be more fully understood from the following detailed description taken in conjunction with the accompanying drawings, in which:

FIG. 1 is a pictorial representation of a compass display according to the invention;

FIG. 2 is a partly broken away pictorial representation of a compass display according to the invention; and FIG. 3 is a pictorial representation of a radar console illustrating the invention in typical use.

DETAILED DESCRIPTION OF THE INVENTION

Referring to FIG. 1 there is shown a remote reading digital compass 10 such as that of the aforesaid copending application and operative to provide an output signal representative of compass heading. Such output signal in the compass of the copending application is a serial pulse train having a number of pulses representative of compass heading. The output signal from compass 10 is applied via a length of flexible interconnecting cable 12 to a junction box 14 which contains electronic circuitry for driving an output display. A length of flexible interconnecting cable 16 connects box 14 to a multidigit indicator 18 which is of a size and configuration approximately that of the cross-section of cable 16. The indicator 18 includes a fastener such as a Velcro pad 20 on the surface opposite to the surface containing the numerical display digits for the purpose of semipermanent attachment to a mounting surface. The indicator 18 is thus seen to be extremely small and flexible disposed for installation on any convenient mounting surface and readily removable for repositioning onto a different mounting surface, as well as being of a sufficiently small size to provide for convenient installation where space is critical.

As seen more particularly in FIG. 2 the indicator 18 includes a multidigit electronic display component such as a segmented light emitting diode display contained within a dual-in-line package of well known form having a parallel array of terminals 24 depending from a base member 26 and having a molded cylindrical lens 28 through which the displayed digits are viewable. The digits are typically of the multiple segment type, selected segments of which are energized to provide visual display of the selected digits. In typical embodiment three digits are employed to provide an output display of up to 359° in one degree increments. The cable 16 contains nine conductors 29 plus a ground conductor 32 connected to appropriate leads 24 of display component 22, while at the other end of cable 16 the respective conductors are connected to appropriate terminals 36 of the circuit board 30.

The cable 12 includes two conductors 31 in addition to a ground conductor 24 and is connected to appropriate terminals 38 of circuit board 30. The ground wire 32 of cable 16 is electrically connected to the ground wire 34 of cable 12 and is in good mechanical connection as well to provide a mechanical link to relieve stress on the electrical terminals 36 and 38 which can be occasioned by tensile forces on cables 12 and 16. The three conductors of cable 12 carry respectively energizing power for the circuitry on circuit board 30, a digital signal representing compass heading for display and ground. The circuit board 30 includes circuitry operative in response to received digital signals from compass 10 to provide appropriate energization of the segments of the display indicators of component 22 to provide visual representation of displayed compass heading. The display circuitry itself is the subject of copending application Ser. No. 434,793, filed Jan. 21, 1974, assigned to the assignee of this invention.

The driving circuitry for a numerical display is usually associated with the display indicators in a common housing; however, according to the invention, the display indicators are alone disposed at a point remote from the display circuitry. The display 18 of this invention includes only the necessary elements for providing the visual compass heading information and is of about the same size as the cross-section of cable 16. The display is thus of convenient size for mounting in otherwise inaccessible positions as well as being of a configuration adapted for removable attachment to one or more display positions.

The display indicator component 22 is molded or otherwise encapsulated within a small housing as illustrated in FIG. 1, while the circuit board 30 is similarly encapsulated or otherwise contained within an enclosure such as shown in FIG. 1. Both the circuit board enclosure and display indicator enclosure can be integrally joined such as by molding to the associated cable jackets to provide a fully molded structure immune to moisture, dirt and other contaminants. The housings for component 22 and circuit board 30 can be of any suitable electrically insulative material such as rubber, epoxy or plastic.

Referring now to FIG. 3, the invention is shown in typical installation in association with a radar console. The display indicator 18 is affixed to the inner surface of a hood 40 which shields a radar screen 42 disposed within a console 44. The indicator 18 is affixed to hood 40 by a semipermanent fastener such as a Velcro pad attached to indicator 18 and cooperative with a similar pad at the mounting position of hood 40. The display indicator is thus in a position for viewing in a substantially coincident manner with the radar screen. The indicator 18 can remain within the radar hood or can be detached when not in use therein for use elsewhere aboard a vessel. The cable 16 can be very flexible and this flexibility together with the small size of indicator 18 provides for an extremely versatile display which can be disposed at otherwise inaccessible positions at various intended points for use.

The invention is not to be limited by what has been particularly shown and described except as indicated in the appended claims.

What is claimed is:

1. For use with a remote reading magnetic compass in which a digital output signal is provided representative of compass headings, circuitry for display of the present compass heading, comprising:
    a first electrical cable having one end connected to a remote reading compass;
    a second flexible electrical cable;
    a multi-digit numerical indicator package of a size and configuration approximating that of said second cable and affixed to one end thereof, and including a single, dual-in-line package, integrated circuit, multi-digit display operative in response to said digital signals, and a housing enclosing said display and in sealing engagement with said second cable;
    an interface circuit connected to the other end of said first cable and to the other end of said second cable and operative to receive the digital compass output signals from said remote reading compass and provide in response thereto second digital signals which are applied to the other end of said second cable for activating the multi-digit display so that the compass heading is displayed thereby; and
    a fastener affixed to said indicator package and adapted for semipermanent attachment to a mounting surface, whereby the indicator package may be readily moved to various locations.

2. The invention according to claim 1 wherein said first and second cables include a ground wire interconnected at said interface circuit to provide both electrical and mechanical interconnection between said lengths of cable.

3. The invention according to claim 1 wherein said fastener includes a Velcro pad affixed to said indicator package and adapted for semipermanent attachment to a like pad on a mounting surface.

* * * * *